(12) United States Patent
Brill et al.

(10) Patent No.: US 7,792,829 B2
(45) Date of Patent: Sep. 7, 2010

(54) TABLE QUERYING

(75) Inventors: Eric D. Brill, Redmond, WA (US);
Matthew R. Richardson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 154 days.

(21) Appl. No.: 11/046,639

(22) Filed: Jan. 28, 2005

(65) Prior Publication Data

US 2006/0173834 A1 Aug. 3, 2006

(51) Int. Cl.
*G06F 17/30* (2006.01)

(52) U.S. Cl. ...................................................... 707/728
(58) Field of Classification Search ...................... 707/3, 707/703, 728, 729; 704/4, 7; 715/531
See application file for complete search history.

(56) References Cited

U.S. PATENT DOCUMENTS

| | | | | |
|---|---|---|---|---|
| 5,873,080 A | * | 2/1999 | Coden et al. | 707/3 |
| 5,950,192 A | * | 9/1999 | Moore et al. | 707/3 |
| 5,950,196 A | * | 9/1999 | Pyreddy et al. | 707/5 |
| 2001/0011296 A1 | * | 8/2001 | Chidambaran et al. | 709/203 |
| 2004/0117739 A1 | * | 6/2004 | Challenger et al. | 715/531 |

OTHER PUBLICATIONS

Pyreddy et al.,International Conference on Digital Libraries Proceedings of the second ACM international conference on Digital libraries Philadelphia, Pennsylvania, United States pp. 193-200, 1997.*
Lerman et al., SIGMOD 2004 Jun. 13-18, 2004, Paris France, pp. 1-12.*
Manocha et al., Intelligence, Spring 2001, pp. 21-29.*
Pinto et al., JCDL'02, Jul. 13-17, Portland, Oregon, pp. 46-55.*

* cited by examiner

*Primary Examiner*—Cheyne D Ly
(74) *Attorney, Agent, or Firm*—Lee & Hayes, PLLC (57) ABSTRACT

The subject invention relates to a system and/or methodology that facilitate converting structured data (e.g., tabular information) into natural language, thus making it available to question answering systems and search engines. More specifically, the system and method employ the vast quantities of natural language on the particular storage system, database, network, or server that a user wishes to search. For example, the system can utilize natural-language based information located on the Web to assist in the task of converting structured data into natural language. In particular, the system can find at least one sentence or sentence fragment on the Web that refers to at least one tuple (e.g., row) in a given table. Following, those sentences can be generalized across all or substantially all tuples in the table. The resulting body of text can be used by the question answering system to answer user queries.

20 Claims, 9 Drawing Sheets

TABLE QUERYING

TECHNICAL FIELD

The subject invention relates generally to searching for information and in particular to searching data maintained in a tabular or other structured form indirectly by associating such data with related data in a searchable language form.

BACKGROUND OF THE INVENTION

The amount of available information or data maintained such as on the World Wide Web ("Web") is vast and almost limitless. However, not all of the information may be easily accessed by a user. For example, current search engines or question answering systems are unable to take advantage of the large quantity of information contained in tabular format including tables, charts, fact lists, etc. This is largely because they depend on information that is encoded as sentences in natural language. As a result, conventional question answering systems severely restrict the amount of information retrievable by the user.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention relates to a system and/or methodology that facilitate converting structured data (e.g., tabular information) into natural language, thus making it available to question answering systems as well as search engines. More specifically, the system and method employ the vast quantities of natural language on the particular storage system, network, or server that a user wishes to search. For ease of explanation, imagine that the user performs a search for information on the Web, for example. The system can utilize the information stored on the Web to assist in the task of converting structured data into natural language based on existing natural language found on the Web. In particular, the system can find at least one sentence or sentence fragment on the Web that refers to some of the tuples (e.g., rows) in a given table. Following, those sentences can be generalized across all or substantially all tuples in the table. The resulting body of text can be used by the question answering system to answer user queries. Essentially, the subject invention can leverage the vastness of the text on the Web to determine the relationships between items maintained in tabular form as well as the sentence syntax with which to state those relations. Once stated in natural language, any language based information retrieval or question answering system can make use of the data.

According to one aspect of the invention, the structured data can be maintained in a non-sentence format and can be converted to a natural or grammar-based language by locating existing natural or searchable language corresponding to at least a portion of the table and then determining the relationships between the portion of the table and the existing searchable language. The existing searchable language may be found on one or more web pages, for instance, and portions of the existing searchable language may match or be similar to at least a portion of data in the table. Portions that match as well as any other relevant text that precedes or follows can be extracted and employed to generalize or convert substantially all the data in the table into a searchable language format. In practice, the structured data can also be converted to non-grammatical language formats as well such as templates (e.g., $person born $date), for example. Moreover, the structured data can be converted to any language or format that facilitates querying.

According to yet another aspect of the invention, an AI (artificial intelligence) component can be employed to automatically determine or infer the most appropriate conversion data for a particular user. In particular, the structured data can be converted to meaningful information in a plurality of ways. Consequently, a plurality of conversions of the same structured data is possible. Hence, by monitoring and learning user behavior as well as examining their search system parameters, the AI component can infer which conversion to make available to the particular user.

In addition, the AI component can be trained explicitly or implicitly to determine which tables, such as on the Web, are more useful to the user than others. Therefore, the less useful tables are less likely to undergo the conversion process To the accomplishment of the foregoing and related ends, certain illustrative aspects of the invention are described herein in connection with the following description and the annexed drawings. These aspects are indicative, however, of but a few of the various ways in which the principles of the invention may be employed and the subject invention is intended to include all such aspects and their equivalents. Other advantages and novel features of the invention may become apparent from the following detailed description of the invention when considered in conjunction with the drawings.

DETAILED DESCRIPTION OF THE INVENTION

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

The subject invention can incorporate various inference schemes and/or techniques in connection with determining the most suitable conversion of tabular data for a particular user. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 1:
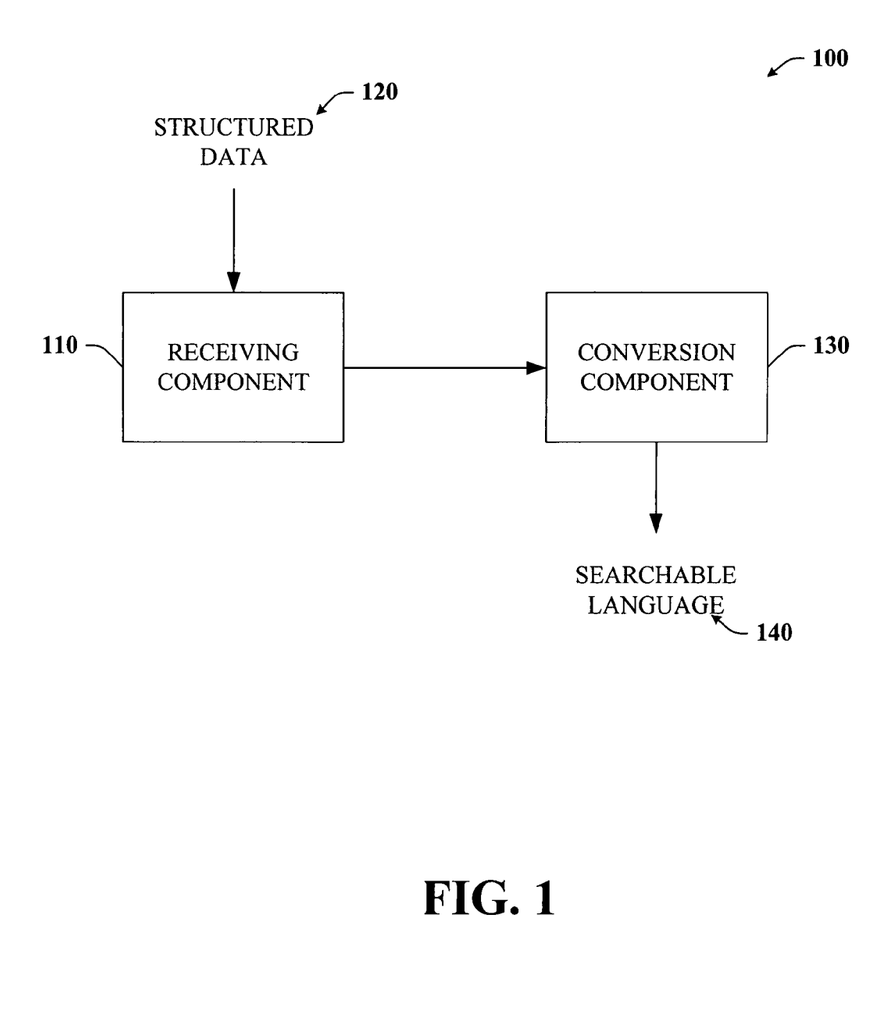
FIG. 1 is a block diagram of a structured data conversion system that facilitates increasing information resources for data retrieval in accordance with an aspect of the subject invention.

Referring now to FIG. 1, there is a high-level block diagram of a system 100 that facilitates responding to requests and/or retrieving information in accordance with an aspect of the subject invention. The system 100 includes a receiving component 110 that can receive a set of structured data 120. The structured data 120 can be non-sentence based and "structured" such as in a table, chart, or list. Thus, the meaning of the various pieces of data found at disparate locations throughout the table, chart, or list can be unknown or non-sensical to conventional search engines and any other information retrieval systems since relations between the data cannot be discerned from the data alone without substantial difficulty.

To make the structured data understandable and queryable, a conversion component 130 can effectively convert the structured data 120 into a searchable language such as a natural or grammar-based language, which can be understood by most if not all search engines and information retrieval systems. The conversion can be accomplished in part by searching through and analyzing text existing in a natural or grammar-based language that at least implicitly references at least a subset of the structured data 120. That is, the existing text need not explicitly reference the structured data but can include content that is similar to a subset of structured data. The existing natural or grammar-based language exhibits meaning and context with respect to its content. For example, an article or report discussing the highlights of the past weekend's college bowl games including scores, teams, and particular key players provides context to and shows relationships between the teams, scores, and players named (e.g., data or facts). Thus, the report can be utilized to ascertain the relationships between the data found on each row or column of a scorecard chart that lists team name, score, and key player per team. It should be appreciated that the scorecard chart can be located on a different site than the article discussing the past weekend's games.

By correlating the existing natural language (that mentions at least a portion of the data stored in tabular form) with such portion of data, substantially all of the data in the table can be converted or somewhat translated into text that is understandable, searchable, and available for retrieval.

In practice, the system 100 can be employed in at least two different scenarios. The first involves "grabbing" a plurality of tables and then converting them to sentences, for example. When the user enters a search, the system 100 can search over that set of sentences. In the second scenario, the system 100 can be employed in a real-time or "on-the-fly" manner. For example, imagine that a user submits a question or search. The system can use the question or search terms in combination with sentences on the web as well as tables (e.g., Table A) to convert such tables (e.g., Table A) to sentences and ultimately answer the question. For instance, the system could look for text sentences relating to and/or including at least a portion of the search question. The text sentences could be found on various sites on the web (in a text article) or could be generated from Table A. Following, the system could then look for other tables related to or having similar content to Table A, and then generate new sentences based on the structured data contained in those tables to facilitate responding to the user's question or search. Thus, by making use of the user's query, only the more relevant tables can be extracted to yield a more efficient search-and-answer process. Furthermore, the user's query can be used in part to determine or choose the language format in which the tables are converted to sentences.

Figure 2:
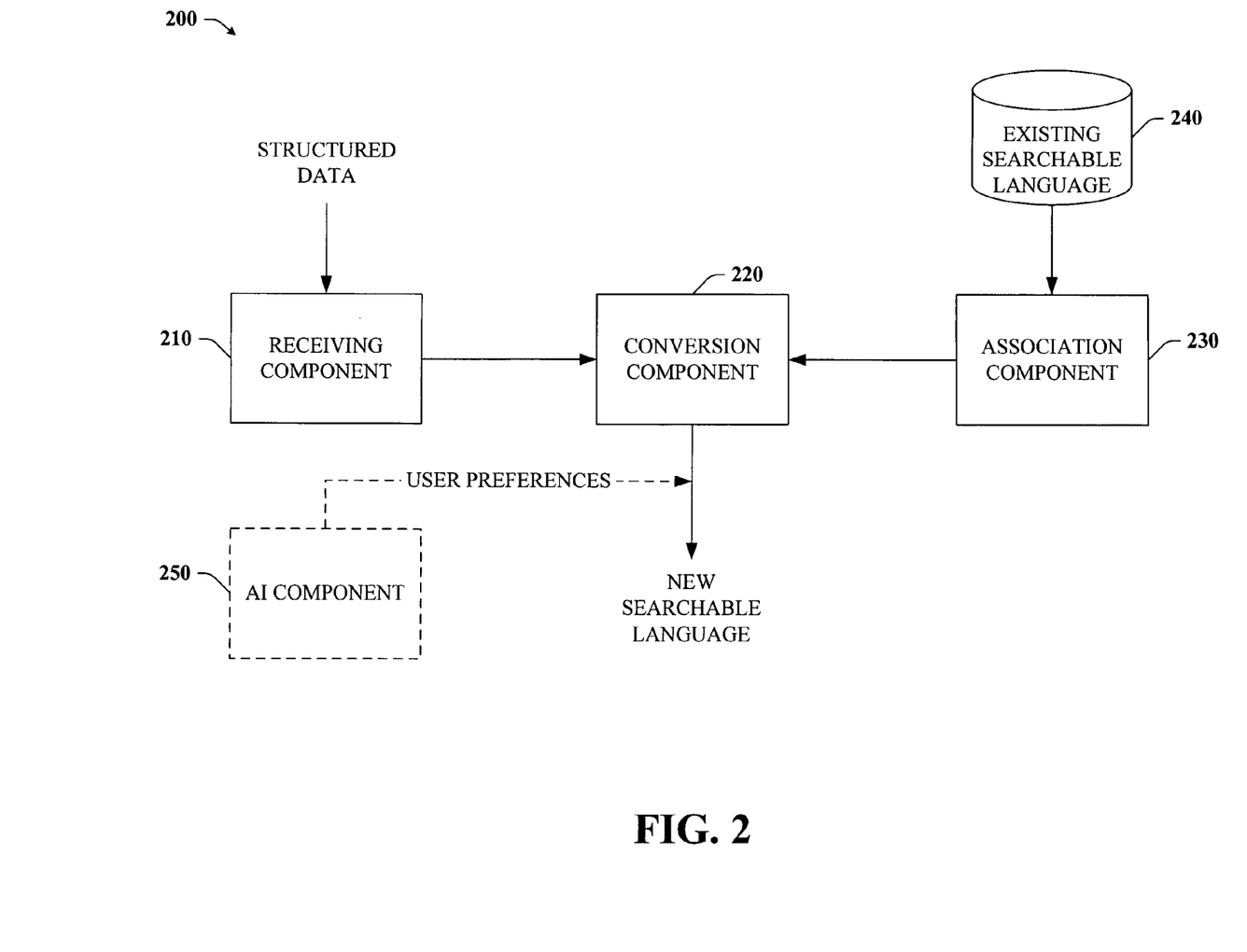
FIG. 2 is a block diagram of an exemplary table querying system that facilitates increasing information resources for data retrieval in accordance with an aspect of the subject invention.

Turning now to FIG. 2, there is a block diagram of a system 200 that facilitates responding to user queries through the retrieval of information from structured data in accordance with an aspect of the subject invention. The system 200 is similar to the system 100 discussed, supra, in FIG. 1, with the exception of a few additional components. The system 200 includes a receiving component 210 that can receive a set of structured data maintained on the Web or some other information database. At least a subset of the structured data can be communicated to a conversion component 220. The conversion component 220 can convert or generalize the otherwise unsearchable structured data into a new searchable body of text. The conversion of unsearchable data into searchable data can be performed at least in part by employing an association component 230. The association component 230 can base its knowledge and/or understanding of various facts and their relationships to one another off of existing searchable language 240 found on the Web or information database.

In practice, for example, imagine that a user has a file or database on his/her machine or network that lists the company's departments, each department manager, and employees in each department in a table format. In order for the user to make use of the data kept in this table when searching for information germane to this table, some other file, document, and/or message (e.g., email, chat, instant message, etc.) also maintained on the machine or network should mention at least a subset of the data in the table. This is needed to learn the relationships between the different data. For instance, in one row of the table, how are the terms Jane, John, Paul, Robert, Lucy, and George related? Associations between different data or facts can be made by correlating the existing searchable language with the relevant structured data. Hence, the data included in each row of the table can be determined to mean something rather than appearing as disparate or disjointed data.

As-is, it is difficult for a natural-language based question answering system or search engine to answer queries using a table of data. However, text generated from the table can be searched and employed to answer such queries. At least one new body of text can be created that is searchable (e.g., presented in a natural or grammar-based language) by conventional search engines and information retrieval systems.

The structured data can be converted into more than one conversion version depending on which "specimens" of existing searchable language are found and used. Hence, the conversion of the structured data can vary depending on conversion parameters or other user-set parameters. Examples of either kind of parameter can include age of existing searchable language (e.g., document, web page, etc.), amount of structured data to correlate with existing searchable language before associations and relations can be determined by the association and/or conversion components, and the like. In view of the possibility of having more than one conversion, the system 200 can also include an AI component 250 that can automatically infer or determine the most preferred conversion version for the user given the user's preferences and/or conversion parameters.

Figure 3:
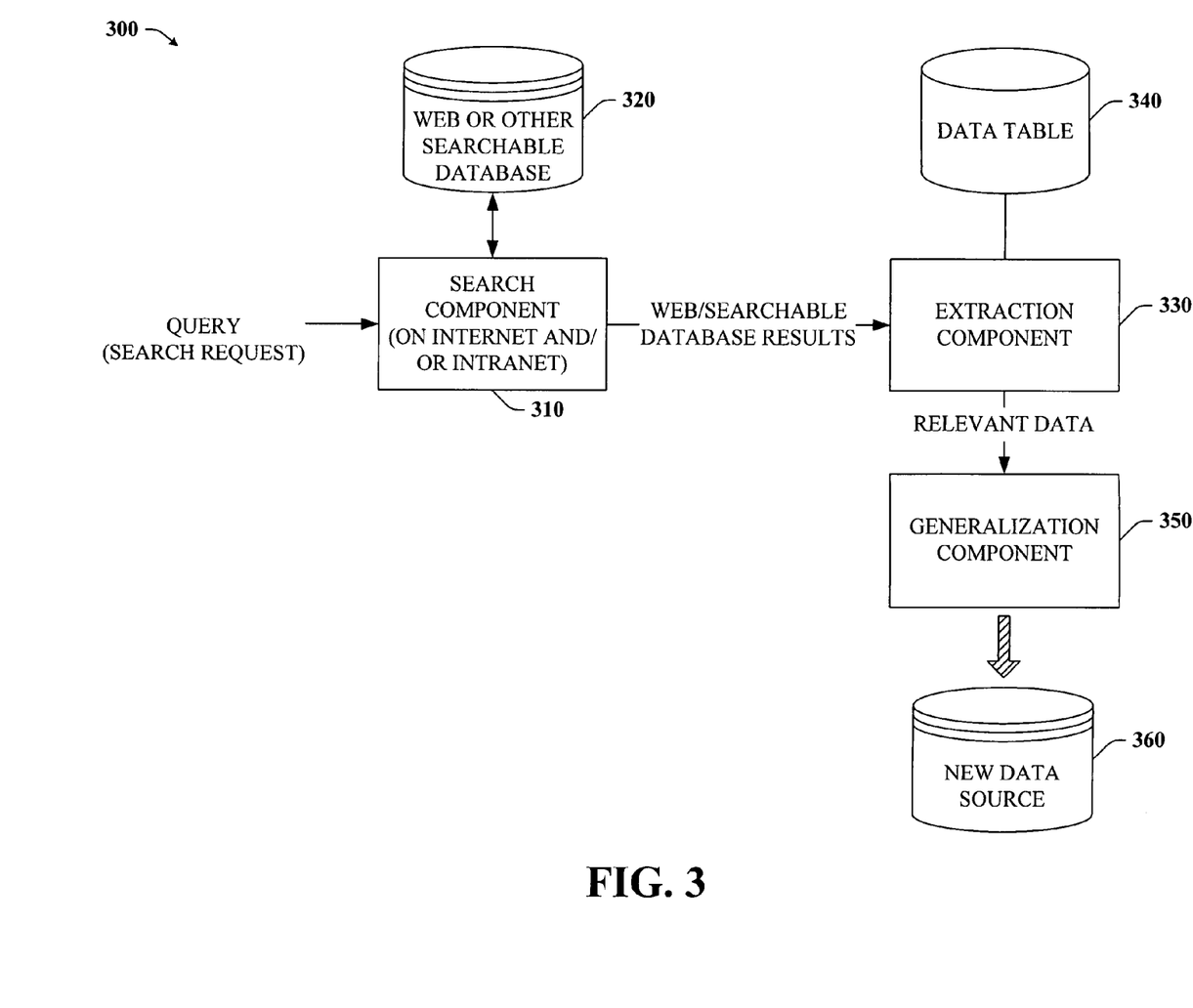
FIG. 3 is a block diagram of an exemplary table querying system that facilitates increasing information resources for data retrieval in accordance with an aspect of the subject invention.

Referring now to FIG. 3, there is illustrated a block diagram of a table querying system 300 that facilitates retrieving information based on a search request or query in accordance with an aspect of the subject invention. The system 300 includes a search component 310 that can be used in connection with the Internet or an intranet. The search component 310 can receive a query and initiate processing the query by looking to structured data for the information or answer.

In general, the search component 310 can search and access any information found in a natural language or grammar-based language on the Web or other searchable database 320. Since structured data (or data maintained in a tabular format) cannot be searched directly by the search component 310, an indirect search can be performed. More specifically, the search component 310 can be employed to conduct a search for terms found in tabular format by looking at natural or grammar-based language documents or pages on the Web or searchable database 320.

The extraction component 330 can extract any relevant information from the searchable database 320 and communicate it to a generalization component 350. The generalization component 350 can then associate the results obtained from the searchable database 320 with at least a subset of structured data in order to learn the various relationships and associations between the (structured) data in a particular table, chart, or list. In doing so, a new searchable data source 360 can be created that essentially points back to the particular table, chart, or list. Thus, when a user enters a search request or question, instead of searching the table directly, the retrieval system can search the grammar-based or natural language text that was generated from the table and then find a match and return an answer to the user. Presumably, it should be understood that the table can be referenced as the source of the information rather than any constructed data (e.g., generated text).

Figure 4:
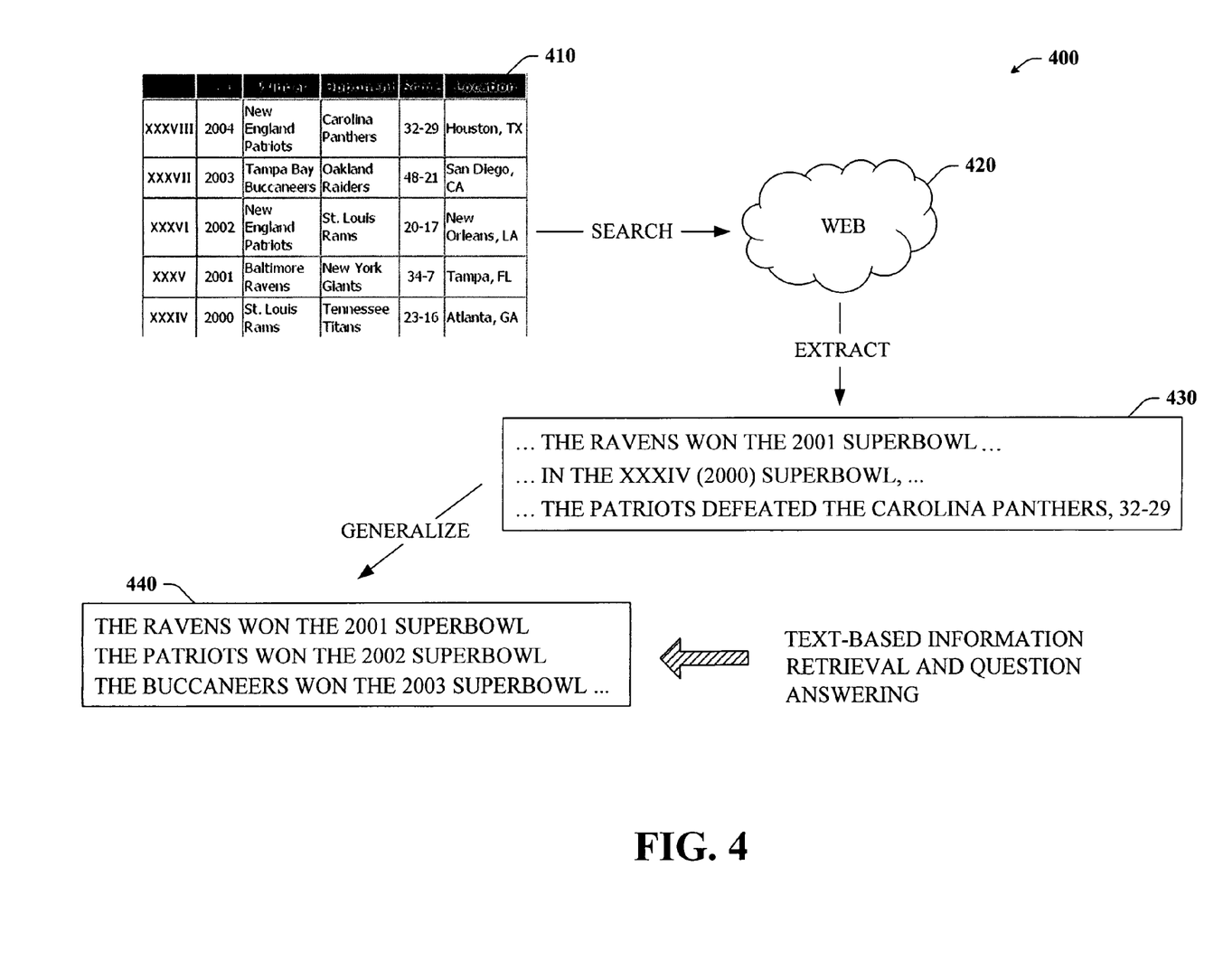
FIG. 4 is a schematic diagram pictorially illustrating tabular conversion into a searchable language in accordance with an aspect of the subject invention.

Referring now to FIG. 4, there is a schematic diagram 400 illustrating one or more aspects of the systems as discussed hereinabove in FIGS. 1-3 to facilitate demonstrating the invention in practice. Imagine that there are tables 410 of data that a user wishes to query. On the one hand, experience has shown that mapping arbitrary natural language queries to queries over the structured data contained in tables is at the very least problematic. Conventional search systems "rewrite" queries as statements, and look for the completion of the statement in a large body of text, such as the Web 420. For example, when asking "Who won the Superbowl in 1979?", a conventional search system may rephrase this as "_____ won the Superbowl in 1979" and may look for sentences of this form (if this exact sentence is not found, techniques are used to find sentences that are approximately the same). This works well for data contained in sentences on the Web, but does not work for other data, such as tables on the Web and/or tables in any other application or database.

On the other hand, turning tables into many equivalent sentences can be difficult for at least two reasons: first, determining the relationship between the data in the table; and second, determining all the possible ways to state the data in sentence format. For instance, given a table containing the term "Ravens" and term "2001" in the same row, it is not known if this refers to the year the Ravens won the Superbowl, were created as a team, lost horribly, had their best season, . . . Then, even if it was known that the relation refers to the year they won the super bowl, more than one sentence could be created: "The Ravens won the Superbowl in 2001", "In 2001, the Ravens won the super bowl", etc.

The system and method proposed herein in FIGS. 1-3, supra, overcomes both of these problems by using the Web as a resource for determining the correct relation as well as the various ways to turn the relation into a sentence. Referring to FIG. 4, the system and/or method can proceed in essentially a few steps: search, extract, and generalize. Given a table, an initial step involves finding sentences (e.g., natural or grammar-based language) which are relevant to its content. For example, the sentence "Unbelievably, the Ravens won the 2001 Superbowl, despite heavy snows" may be found, which matches two of the terms of a given row in the table. Besides depending on the content of the table itself, the table header, caption, text near the table (title of the web page it was found on, the section the table was found in, text near the table, etc), etc. can also be utilized in order to find sentences that are relevant to the content of the table. This part of the system and/or method can proceed by sending queries to at least one of a search engine, collection of text, database, searchable collection, and the like and retrieving the resulting documents or summaries therefrom. For instance, a specific website, a local pile of documents, and/or a cache of web pages can receive such queries. The search queries may comprise terms in the table, optionally with other terms, which may include the above mentioned, to improve the search process.

Following, the relevant sentences and/or sentence fragments 430 from the Web pages that are returned can be extracted. According to one aspect of the invention, only the portions of the Web page that involve data in the table are extracted. However, it should be appreciated that this is not necessarily limited to the portion of the page that matched any particular search.

Thereafter, the extracted sentences or sentence fragments can be used to construct a collection of sentences or of grammatical fragments 440 describing the entire table. For each sentence or fragment extracted, a sentence template can be constructed and then applied to every row of the table to generate multiple sentences. For example, the sentence "The Ravens won the 2001 Superbowl" would generate the sentences "The Patriots won the 2004 Superbowl", "The Buccaneers won the 2003 Superbowl", etc . . . The resulting collection of sentences and/or grammatical fragments can be employed as a source for text-based information retrieval and question answering systems.

Various methodologies in accordance with the subject invention will now be described via a series of acts, it is to be understood and appreciated that the subject invention is not limited by the order of acts, as some acts may, in accordance with the subject invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

Figure 5:
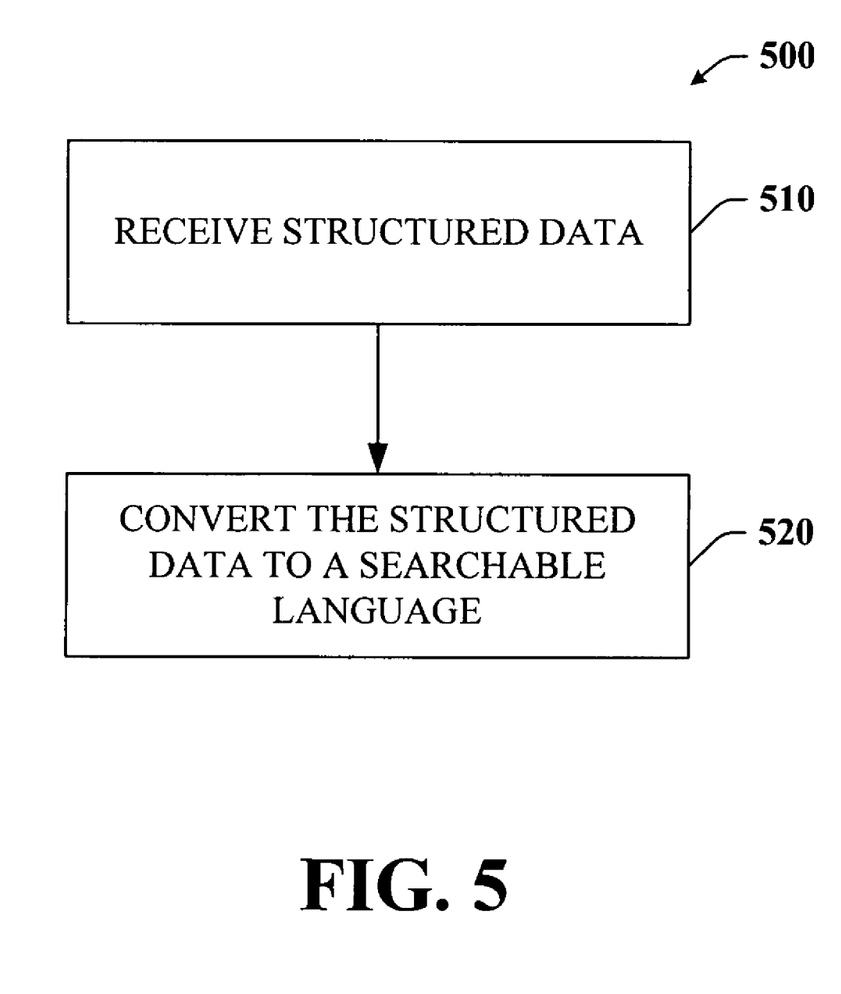
FIG. 5 is a flow chart illustrating an exemplary methodology that facilitates converting unsearchable structured data into a searchable language to assist in the answering of search queries in accordance with an aspect of the subject invention.

Referring now to FIG. 5, there is a flow diagram of an exemplary process 500 that facilitates responding to queries in accordance with an aspect of the subject invention. The process 500 involves receiving structured data at 510. The data can be structured in the form of a table, chart, or list as well as a tree-view (e.g., file or directory system) or hierarchal structure. At 520, the structured data or at least a portion thereof can be converted to a searchable language such as a natural or grammar-based language. Essentially, the conversion can be accomplished in part by finding existing text in natural language form that relates to at least a portion of the structured data content. Based on the existing text, the structured data can be converted into sentences or grammar-based phrases. These sentences and phrases effectively describe the structured data and can be used to retrieve information from the otherwise unsearchable structured data.

Figure 6:
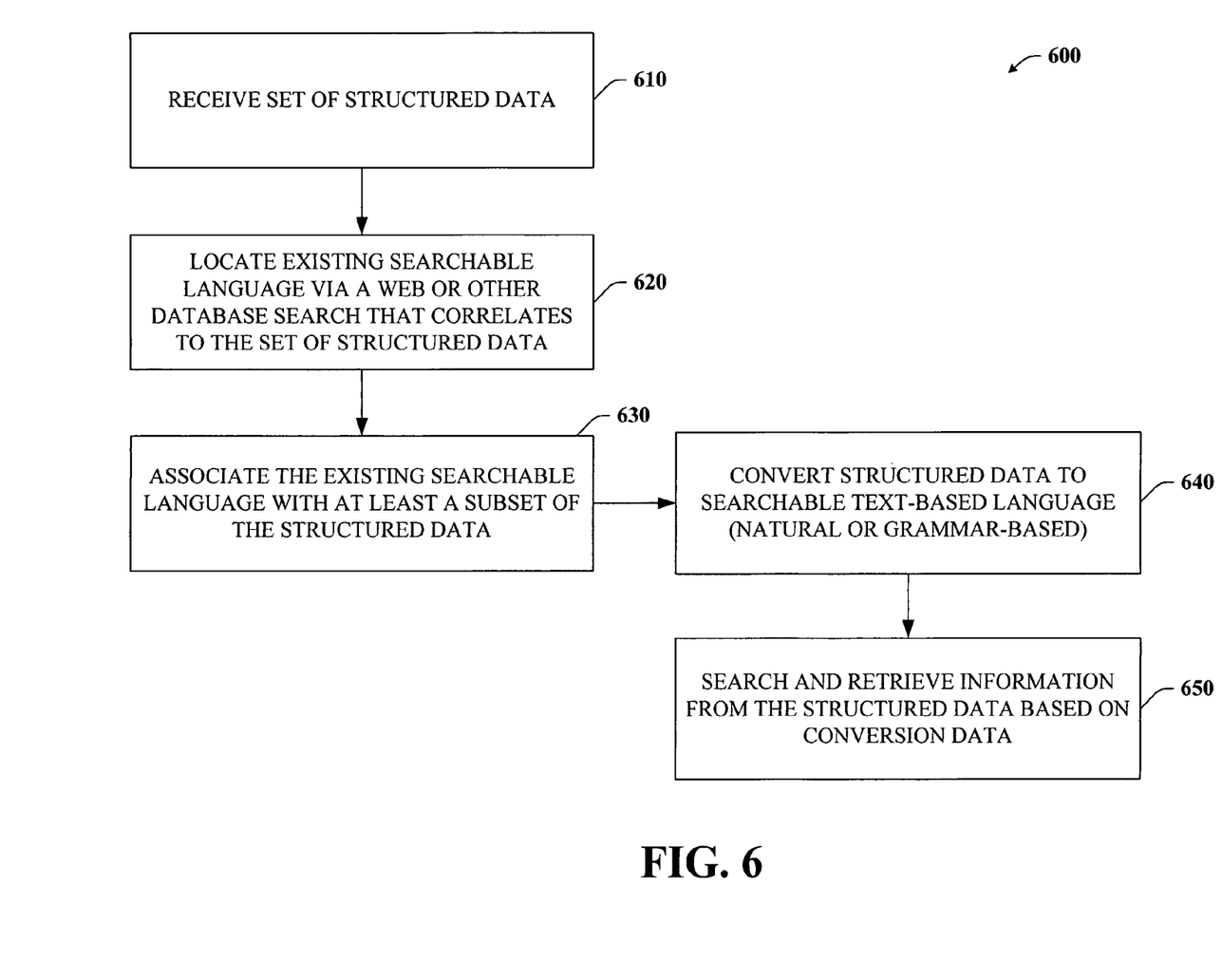
FIG. 6 is a flow chart illustrating an exemplary methodology that facilitates converting unsearchable structured data into a searchable language to assist in the answering of search queries in accordance with an aspect of the subject invention.

Referring now to FIG. 6, there is illustrated a flow diagram of an exemplary method 600 that facilitates retrieving information from structured data (e.g., data tables) to respond to user queries. It should be understood that a user query can occur at any point in the method 600, which means that the query terms can be inputs to any of the boxes shown in the diagram. Thus, the method 600 represents merely one possible arrangement. In particular, the method 600 involves receiving a set of structured data at 610 that a user desires to search to obtain some information. Recall that the structured data cannot be readily or easily searched as-is by current search engines and data retrieval systems.

For purposes of discussion, imagine that the structured data is located on the Web. However, it should be appreciated that the structured data can be located on any network, database, server, client machine, or any other storage device. At 620, searchable language already existing on the Web, in this case, that correlates to the set of structured data can be searched for and extracted from their respective locations on the Web. Whether the existing language correlates to the structured data can be determined in part by matching terms included in the structured data with the existing language found on the Web.

At 630, the extracted language correlating to at least a subset of the structured data can be associated with the natural or grammar-based language to learn the relationships between the various parts of the structured data. For example, suppose the structured data is a company sales chart indicating gross sales per month per department for the company's 2004 fiscal year. However, to a search engine, the structured data appears as a plurality of different data terms without any context or meaning as to how the terms may or may not relate to one another.

The Web, for instance, may contain reports written by financial analysts, market watchers, and/or company officials describing the sales performance for 2004 in varying levels of detail. Unlike the context provided in the natural language of such reports, the chart itself contains rows of data, wherein one row might include the terms "Apparel" and "$1.2M". Unfortunately, the relation between these terms (data) cannot be discerned by the data alone. That is, it is relatively unknown whether Apparel sold $1.2M, lost $1.2M, profited $1.2M, budgeted $1.2M, or expended $1.2M.

However, by extracting the relevant portions of the reports or other documents found on the Web that discuss the terms found in the chart, meaningful relationships and context can be impugned into the structured data. Hence, the structured data can be converted to a searchable text-based language at 640 and as a result, the structured data can now be searched at least indirectly and information can be retrieved therefrom using the conversion results (e.g., the searchable text-based language) at 650.

Figure 7:
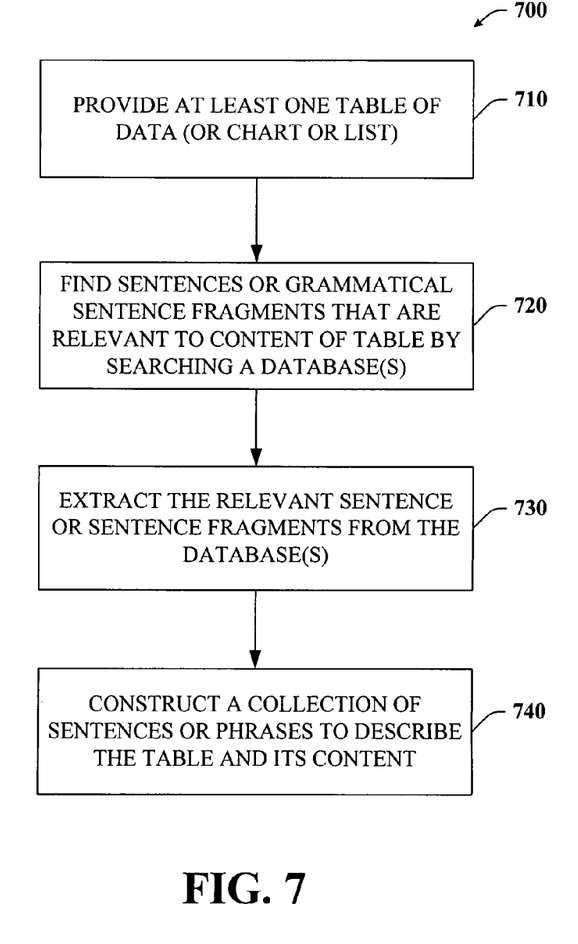
FIG. 7 is a flow chart illustrating an exemplary methodology that facilitates converting unsearchable structured data into a searchable language to assist in the answering of search queries in accordance with an aspect of the subject invention.

Referring now to FIG. 7, there is shown a flow diagram of an exemplary method 700 that facilitates searching and retrieving information from structured data such as data found in tables, charts, and/or lists. The method 700 involves providing at least one table, chart, or list of data stored on a searchable database at 710. At 720, sentences or grammatical sentence fragments that are relevant to the content of the table, chart, or list can be located by searching the database (using a search engine). The relevant sentence or sentence fragments can be extracted from the database at 730. At 740, a collection of sentences or grammatical phrases (in natural language) can be constructed, wherein the collection describes the table, chart, or list and its content. Thus, the collection can be searched and information can be retrieved therefrom as if the search engine were directly searching the table, chart, or list.

Figure 8:
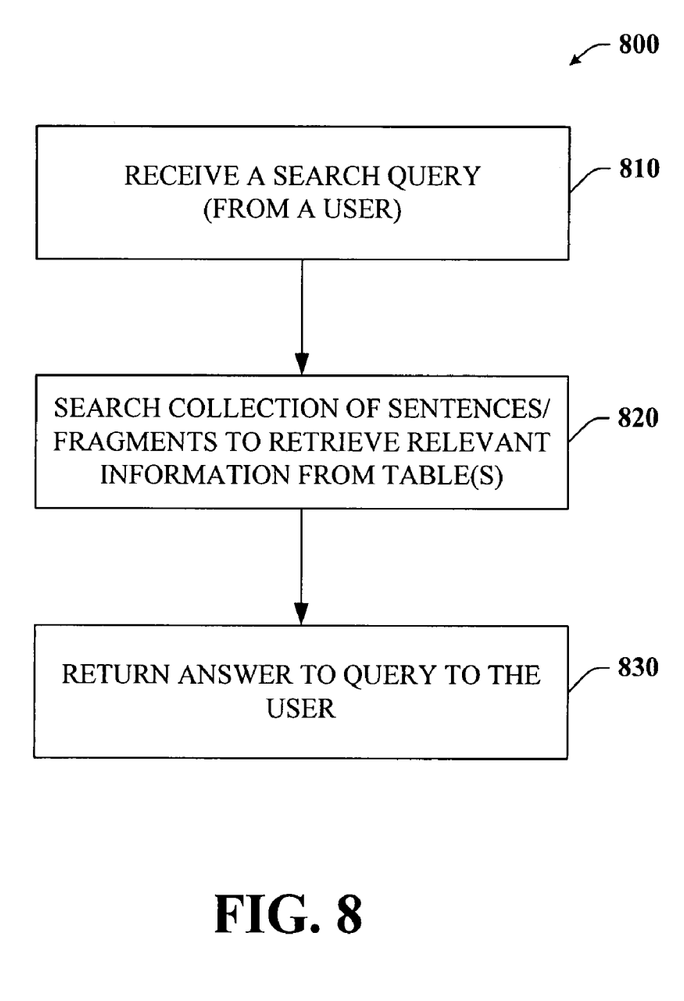
FIG. 8 is a flow chart illustrating an exemplary methodology that facilitates processing a search request in part by searching a collection of text-based data generated from unsearchable structured data in accordance with an aspect of the subject invention.

Turning now to FIG. 8, there is a flow diagram of an exemplary query response process 800 that makes use of the collection of sentences or grammatical phrases (e.g., conversion results) as discussed in FIG. 7, supra. The process 800 involves receiving a search query from a user, for instance, at 810. At 820, one or more collections of sentences and phrases (fragments) can be searched or looked through to retrieve any relevant information from the corresponding table(s). When a suitable response is determined, it can be returned to the user at 830. Moreover, the corresponding tables can be searched indirectly using the collection of sentences and phrases generated from the table.

Figure 9:
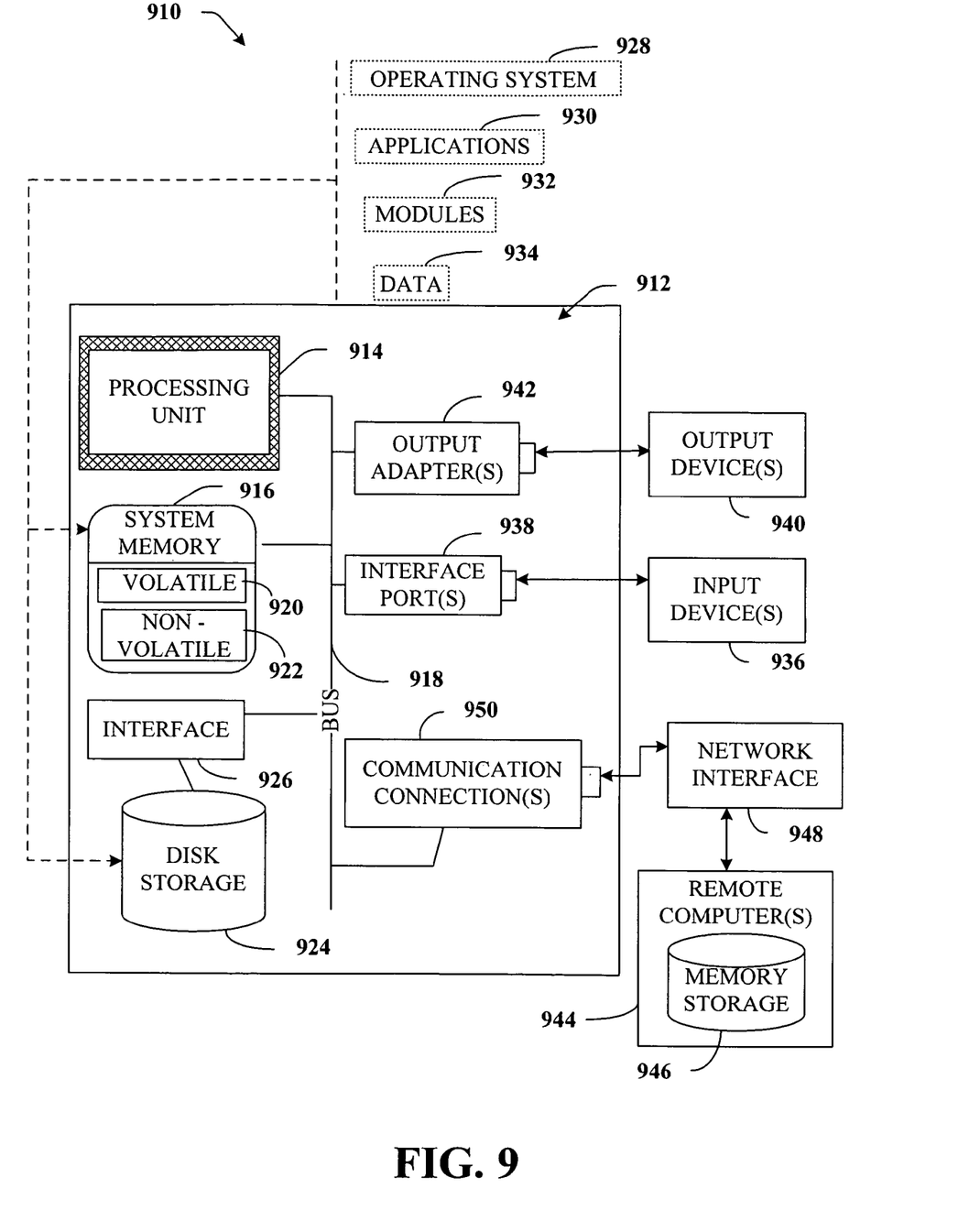
FIG. 9 illustrates an exemplary environment for implementing various aspects of the invention.

In order to provide additional context for various aspects of the subject invention, FIG. 9 and the following discussion are intended to provide a brief, general description of a suitable operating environment 910 in which various aspects of the subject invention may be implemented. While the invention is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 910 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 9, an exemplary environment 910 for implementing various aspects of the invention includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRDRAM).

Computer 912 also includes removable/nonremovable, volatile/nonvolatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that the subject invention can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications, and variations that fall within the spirit and scope of the appended claims.

Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system configured to process a table query comprising:
   a processor and a memory communicatively coupled to the processor, the memory having stored instructions that, when executed, configure the computing system to implement:
   obtaining the table comprising a plurality of table entries organized by rows and columns;
   performing a search of an information store based on table entries from a row of the table;
   extracting sentences or sentence fragments from the search results, the extracted sentences or sentence fragments comprising one or more portions matching the table entries;
   deriving a sentence template from the extracted sentences or sentence fragments, the sentence template not including the one or more portions matching the table entries and having a structure such that addition of table entries from a row into the sentence template transforms the sentence template into a sentence associated with the row from which the table entries were obtained;
   replicating a copy of the sentence template for each row in the table;
   constructing a collection of sentences for the table comprising a sentence for each row constructed using the sentence template and table entries from that row;
   finishing the sentence template for each row, using table entries from that row, into a sentence for each row; and
   in response to a request to search the table, searching the sentences associated with the rows of the table.

2. The system of claim 1, wherein the search of the information store is additionally based on a header of the table, a caption, or a text near the table.

3. The system of claim 1, wherein performing the search of the information store based on table entries from the row of the table comprises performing a search of Internet at a search engine.

4. The system of claim 1, wherein performing the search of the information store based on table entries from the row of the table comprises performing a search of an Intranet at a search engine.

5. The system of claim 1, wherein performing the search of the information store based on table entries from the row of the table comprises extracting at least one of relevant sentences or relevant sentence fragments from one or more web pages.

6. The system of claim 5, wherein one or more portions of the web page that involve table entries are extracted.

7. The system of claim 1, wherein deriving the sentence template from the results of the search comprises operation of an AI (artificial intelligence) component that determines the sentence template from the results of the search.

8. The system of claim 7, wherein the AI component further determines a most suitable conversion from a plurality of conversions based on at least one of a user query, user-specific parameters, and group-specific parameters.

9. The system of claim 1, wherein the table is not sentence based.

10. A computer implemented method that facilitates responding to user queries comprising:
    obtaining a table comprising a plurality of table entries organized by rows and columns;
    performing a search of an information store based on table entries from a row of the table;
    extracting sentences or sentence fragments from the search results, the extracted sentences or sentence fragments comprising one or more portions matching the table entries;
    deriving a sentence template from the extracted sentences or sentence fragments, the sentence template not including the one or more portions matching the table entries and having a structure such that addition of table entries from a row into the sentence template transforms the sentence template into a sentence associated with the row from which the table entries were obtained;
    replicating a copy of the sentence template for each row in the table;
    constructing a collection of sentences for the table comprising a sentence for each row constructed using the sentence template and table entries from that row;
    finishing the sentence template for each row, using table entries from that row, into a sentence for each row; and
    in response to a request to search the table, searching the sentences associated with the rows of the table.

11. The computer implemented method of claim 10, wherein the search of the information store is additionally based on a header of the table, a caption, or a text near the table.

12. The computer implemented method of claim 10, wherein performing the search of the information store based on table entries from the row of the table comprises performing a search of an Intranet at a search engine.

13. The computer implemented method of claim 10, wherein deriving the sentence template from the results of the search comprises operation of an AI (artificial intelligence) component that determines the sentence template from the results of the search.

14. The computer implemented method of claim 10, wherein the table is not sentence based.

15. A computer storage medium encoded with processor-executable instructions that, when executed, direct a computing system to perform a method, the method comprising:
    obtaining a table comprising a plurality of table entries organized by rows and columns;
    performing a search of an information store based on table entries from a row of the table;
    extracting sentences or sentence fragments from the search results, the extracted sentences or sentence fragments comprising one or more portions matching the table entries;
    deriving a sentence template from the extracted sentences or sentence fragments, the sentence template not including the one or more portions matching the table entries and having a structure such that addition of table entries from a row into the sentence template transforms the sentence template into a sentence associated with the row from which the table entries were obtained;
    replicating a copy of the sentence template for each row in the table;
    constructing a collection of sentences for the table comprising a sentence for each row constructed using the sentence template and table entries from that row;
    finishing the sentence template for each row, using table entries from that row, into a sentence for each row;

in response to a request to search the table, searching the sentences associated with the rows of the table.

16. The computer storage medium of claim 15, wherein the search of the information store is additionally based on a header of the table, a caption, or text near the table.

17. The computer storage medium of claim 15, wherein performing the search of the information store based on table entries from the row of the table comprises performing a search of Internet at a search engine.

18. The computer storage medium of claim 15, wherein deriving the sentence template from results of the search comprises operation of an AI (artificial intelligence) component that determines the sentence template from the results of the search.

19. The computer storage medium of claim 18, wherein the AI component further determines a most suitable conversion from a plurality of conversions based on at least one of a user query, user-specific parameters, and group-specific parameters.

20. The computer storage medium of claim 15, wherein the table is not sentence based.

* * * * *